No. 879,848. PATENTED FEB. 25, 1908.
G. H. BENEDICT.
AEROPLANE.
APPLICATION FILED MAR. 18, 1907.
2 SHEETS—SHEET 1.
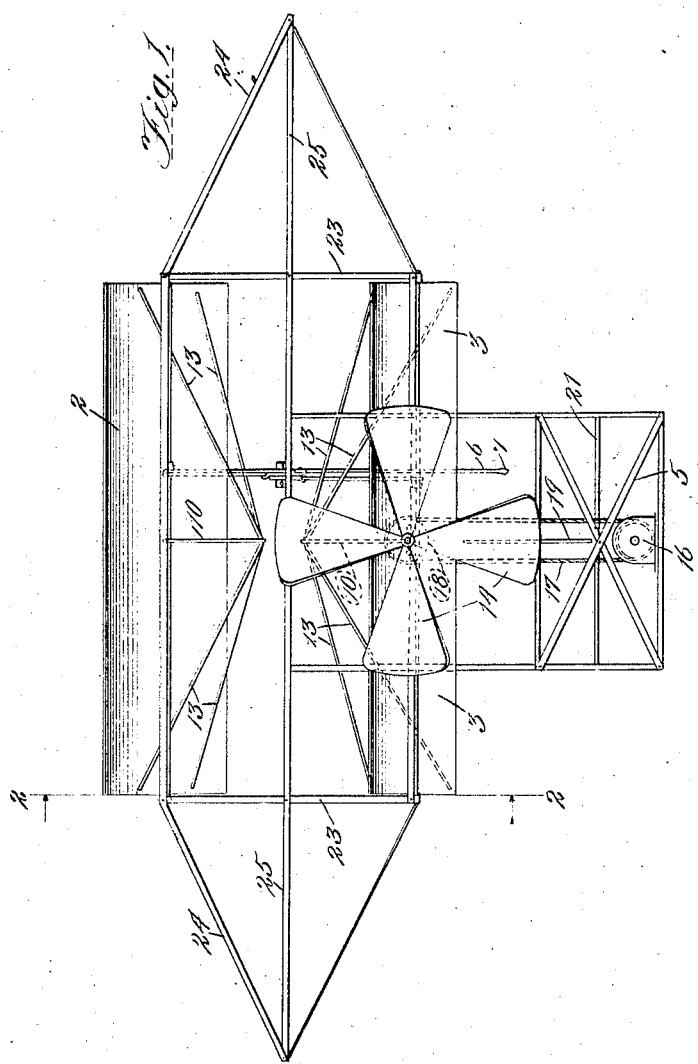

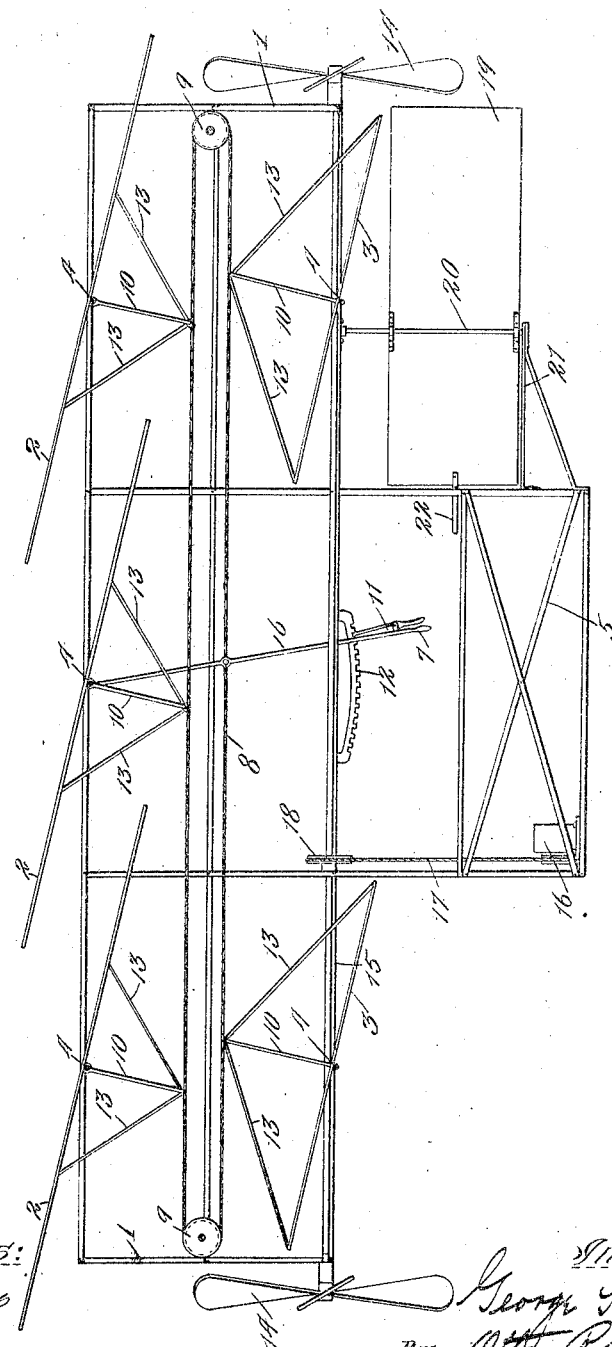

UNITED STATES PATENT OFFICE.

GEORGE H. BENEDICT, OF CHICAGO, ILLINOIS.

AEROPLANE.

No. 879,848.

Specification of Letters Patent.

Patented Feb. 25, 1908.

Application filed March 18, 1907. Serial No. 363,079.

*To all whom it may concern:*

Be it known that I, GEORGE H. BENEDICT, a citizen of the United States, residing at Chicago, in the county of Cook and State of Illinois, have invented certain new and useful Improvements in Aeroplanes, of which the following is a specification.

My invention relates to flying machines, and particularly to the type of flying machine commonly called "aeroplanes", which are provided with extended surfaces so that when driven at considerable speed they will be buoyed or sustained by pressure of the air. Heretofore machines of this character, in order to operate with any degree of success have been obliged to be driven at a very great speed, usually at a speed of twenty-five to thirty-five miles an hour, which has resulted, of course, in making their management very difficult and very dangerous.

My invention has for an object to so construct an aeroplane that it will rise more easily from the ground, be sustained in the air at a less speed than has heretofore been possible and be governed and operated more easily.

More particularly my invention has for its object to construct a flying machine of this type with a plurality of planes suitably mounted in the frame-work of the machine between vertical planes and so as to be capable of change in angular position. These planes are capable of being tilted at various angles, in order to meet the different conditions involved in rising, descending, or maintaining flight at a constant level.

The invention further provides for the mounting of these planes centrally, in the manner of the old-fashioned window shutter so that they are balanced and may be easily shifted with little effort.

My invention has for a further object to provide the machine with lateral parachute-like devices which aid in sustaining the machine in the air and retard its descent.

The invention has for its object such other and further improvements and devices as are shown in the drawings and will be described in the following specification.

The invention is illustrated in the accompanying drawings wherein:

Figure 1 is an end elevation of a form of apparatus embodying my invention; and Fig. 2 is a longitudinal sectional view on the line 2—2 of Fig. 1, looking in the direction indicated by the arrows.

Like numerals of reference indicate like parts in the several figures of the drawings.

1 represents the frame-work of the machine, which may be of any desired material and construction, and 2, 3 the planes. There may be any number of these planes. Preferably, they are arranged in parallel series or layers, one series, 2, 2, 2, above the others 3, 3. I have shown them arranged in two series or layers, but it will be obvious that they may be multiplied to any extent or that a single series only might be used.

In the drawings I have shown three planes in the upper series, being arranged tandem, and two in the lower series. The number and precise arrangement may be varied to any extent. The planes might obviously be arranged several abreast.

The planes are preferably hinged at their centers, as at 4 on the frame-work.

5 represents a car in which the operator stands or sits and a controller is provided for shifting the angular position of the planes, which controller is arranged to be within reach of the operator in the car.

Any desired means for shifting the planes may be adopted. I have shown a lever 6 having a handle 7 and fulcrumed on the frame-work 1. This lever is connected with and operates an endless cord or cable 8 which runs over pulleys 9, 9 at each end of the frame-work. The several planes are provided with perpendicular rods or cranks 10 which are attached to the cord 8. The controller lever may be held in its various positions by any usual form of pivoted dog, such as that shown at 11, which engages with a segment 12 on the frame-work. The planes may be guyed or reinforced by the guys 13. It will be seen that a single movement of the controlling lever will shift the angular position of all of the planes simultaneously. Preferably the planes of the upper series are made to overlap. In this way I gain a considerable area of buoying surface when the planes are set in their angular position, that is, when the air pressure is being utilized to lift as well as to sustain the machine.

The machine may be propelled in any desired manner. I have shown it provided with two propellers 14, arranged one at each end of the apparatus and on a common shaft 15, the lower planes being slotted so as to tilt without interference with this shaft. These propellers give the car its forward propulsion. The shaft 15 may be driven in any desired manner. For example, I have shown a gasolene motor 16 located in the car, the driving belt or chain 17 of which extends over a pulley 18 on the shaft 15. I also provide some suitable rudder for steering the machine from side to side. This rudder is also preferably pivoted so that it is balanced in its movement and easily shifted. I have shown this rudder as a plane 19 centrally journaled on a rod 20 extending from the frame 1 to an extension piece 21 from the car. The rudder is provided with a handle 22 which extends into the car and easily within reach of the operator. The rudder is preferably pivoted forward of the center.

In order to facilitate the easy descent of the device and also to make it more buoyant, I prefer to provide it with lateral parachute-like devices. These devices consist of the vertical planes 23, 23, and the inclined planes 24, 24. Extensions 25, 25, from the framework 1 connect with the outer edges of planes 24, bracing this part of the structure. The vertical planes 23, 23 inclose the space below the upper planes 2, 2 and prevent the wind from spilling out from under these latter planes, operating in the same manner as the sides of a box kite.

My device will operate as follows: The operator sits or stands in the car with the lever 6 at one hand and the handle 22 at the other. By shifting the lever 6, the planes may be set at any desired angle. In starting they will preferably be set at a considerable inclination, in order to increase the lifting effect of the forward propulsion of the apparatus. The apparatus will, of course, be started on a car, or in some such well-known manner. When the machine has risen to the proper altitude, the angle of the planes may be changed so as to maintain the machine at a given altitude. The angle will depend upon the condition of the wind and also upon the velocity of the machine. When it is desired to rise or descend, the planes will be shifted accordingly.

It will be seen that the device operates, in effect, like a box kite, except that the angle of the planes may be shifted according to varying circumstances. These planes serve the double purpose of buoying the machine and also of steering it in its rise and descent.

The parachute devices at the sides of the machine serve to steady and buoy the same and provide means for decreasing its rapidity of descent in case the driving apparatus becomes deranged.

The apparatus may be provided with the lifting propellers commonly used in devices of this character, but these will be entirely auxiliary to the lifting function of the planes. Under ordinary circumstances the lifting propellers may be dispensed with entirely, the angular position of the planes themselves being sufficient to direct the course of the machine upward.

I wish it to be understood that I do not desire to limit myself to the particular devices or arrangements herein shown and described, as obvious modifications will occur to persons skilled in the art.

The arrangement of the rudder at the back end of the machine is not material. It might be placed at the front end, or above the planes.

It will be clear that the arrangements and devices of my invention might be used in any sort of flying machine where the aeroplane principle is utilized, even though other propelling or buoying agencies were also made use of.

I claim:

1. The combination with a suitable framework comprising vertical planes and propelling means, of a plurality of movable planes, said planes being mounted in the frame-work and between the vertical planes so as to be capable of changes in angular position, and controlling means for changing the angular positions of said planes.

2. The combination with a frame-work comprising vertical planes and propelling means, of a plurality of movable planes mounted at their centers on such frame-work and between the vertical planes so as to be capable of change in angular position, and controlling means for changing the angular positions of said planes.

3. The combination with a suitable frame-work comprising vertical planes and propelling means, of a plurality of movable planes mounted in said frame-work and between the vertical planes so as to be capable of change in angular position, said planes being arranged one above the other, and controlling means for changing the angular positions of said planes.

4. The combination with a suitable frame-work comprising vertical planes and propelling means, of a plurality of movable planes mounted in said frame-work and between the vertical planes so as to be capable of change in angular position, said planes being arranged in series, one series located above the other, and controlling means for changing the angular positions of said planes.

5. The combination with a suitable frame-work comprising vertical planes and propelling means, of a plurality of movable planes mounted in said frame-work and between the vertical planes so as to be capable of change in angular position, said planes being arranged in parallel series, one series above the other, and controlling means for changing the angular positions of said planes.

6. The combination with a suitable frame-work comprising vertical planes and propelling means, of a plurality of movable planes mounted in said frame-work and between the vertical planes so as to be capable of change in angular position, said planes being arranged in parallel series, one series above the other, controlling means for changing the angular positions of said planes, and a car swung from the frame-work below said planes.

7. The combination with a suitable frame-work and propelling means, of a plurality of planes mounted in said frame-work so as to tilt fore and aft, side planes transverse to the tilting planes and inclosing the space beneath the same controlling means to control the movement of said planes, and a rudder to guide the apparatus in its lateral movement.

8. The combination with a suitable frame-work and propelling means, of a plurality of planes mounted in said frame-work so as to tilt fore and aft, said planes being arranged in series, one series above the other, side planes transverse to the tilting planes and inclosing the space between the series of planes controlling means for tilting said planes, and a rudder for guiding the apparatus in its lateral movements.

9. The combination with a suitable frame-work and propelling means, of a plurality of planes mounted in said frame-work so as to be capable of change in angular position, controlling means for changing the angular positions of said planes, and parachute devices at the sides of the machine comprising planes set at an angle to each other and arranged so as to inclose the space beneath said first-mentioned planes.

10. The combination with a suitable frame-work comprising vertical side planes and propelling means, of a plurality of movable planes mounted in said frame-work between the side planes, and parachute devices at each side of said frame-work comprising downwardly inclined planes extending from the vertical planes.

11. The combination with a suitable frame-work and propelling means, of a plurality of overlapping planes arranged tandem, said planes being mounted in the frame-work so as to be capable of change in angular position, and controlling means for changing the angular position of said planes.

12. The combination with a suitable frame-work and propelling means, of a plurality of planes mounted in said frame-work so as to be capable of change in angular position, said planes being arranged tandem and in series, one series located above the other, the planes of the upper series arranged so as to overlap, and controlling means for changing the angular position of said planes.

13. The combination with a suitable frame-work and propelling means, of vertical planes inclosing said frame-work on the sides, a plurality of tilting planes mounted on the frame-work within the vertical planes, and controlling means for changing the angular position of the tilting planes.

14. The combination with a suitable frame-work and propelling means, of vertical planes inclosing said frame-work on the sides, a plurality of tilting planes mounted on the frame-work within the vertical planes, controlling means for changing the angular position of the tilting planes, and fixed, inclined planes extending from the sides of the frame-work.

15. The combination with a frame-work comprising vertical planes, of a plurality of movable planes mounted in said frame-work so as to be capable of being tilted vertically, and controlling means for tilting said planes, said vertical planes being arranged to inclose space between said tilting planes.

GEORGE H. BENEDICT.

Witnesses:
PERCIVAL H. TRUMAN,
H. L. PECK.